Nov. 23, 1926.
A. BOYNTON
1,607,662
ROTARY REAMER
Filed July 20, 1925     2 Sheets-Sheet 2
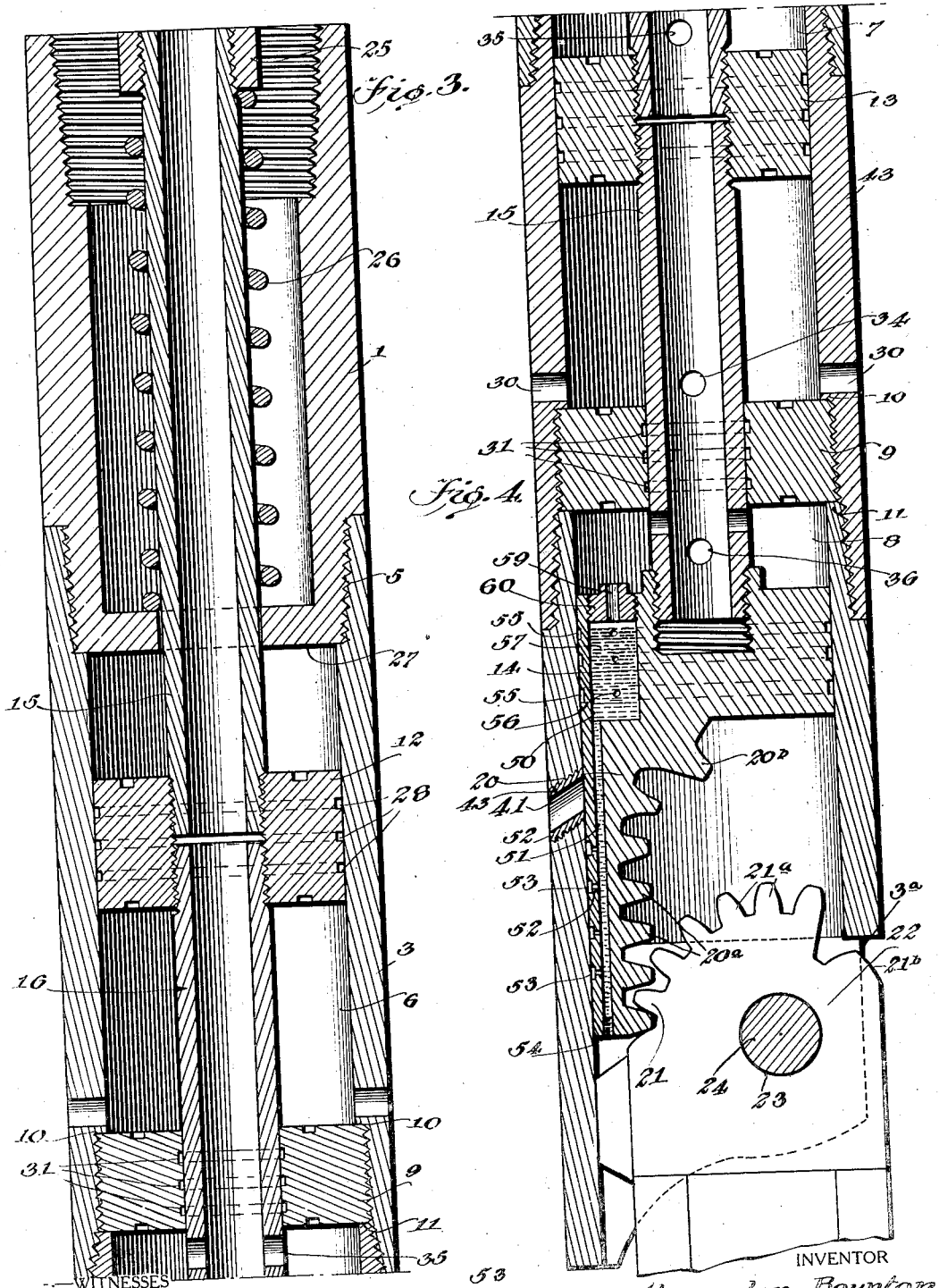
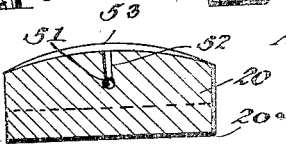
INVENTOR
*Alexander Boynton*
BY
ATTORNEYS Patented Nov. 23, 1926.

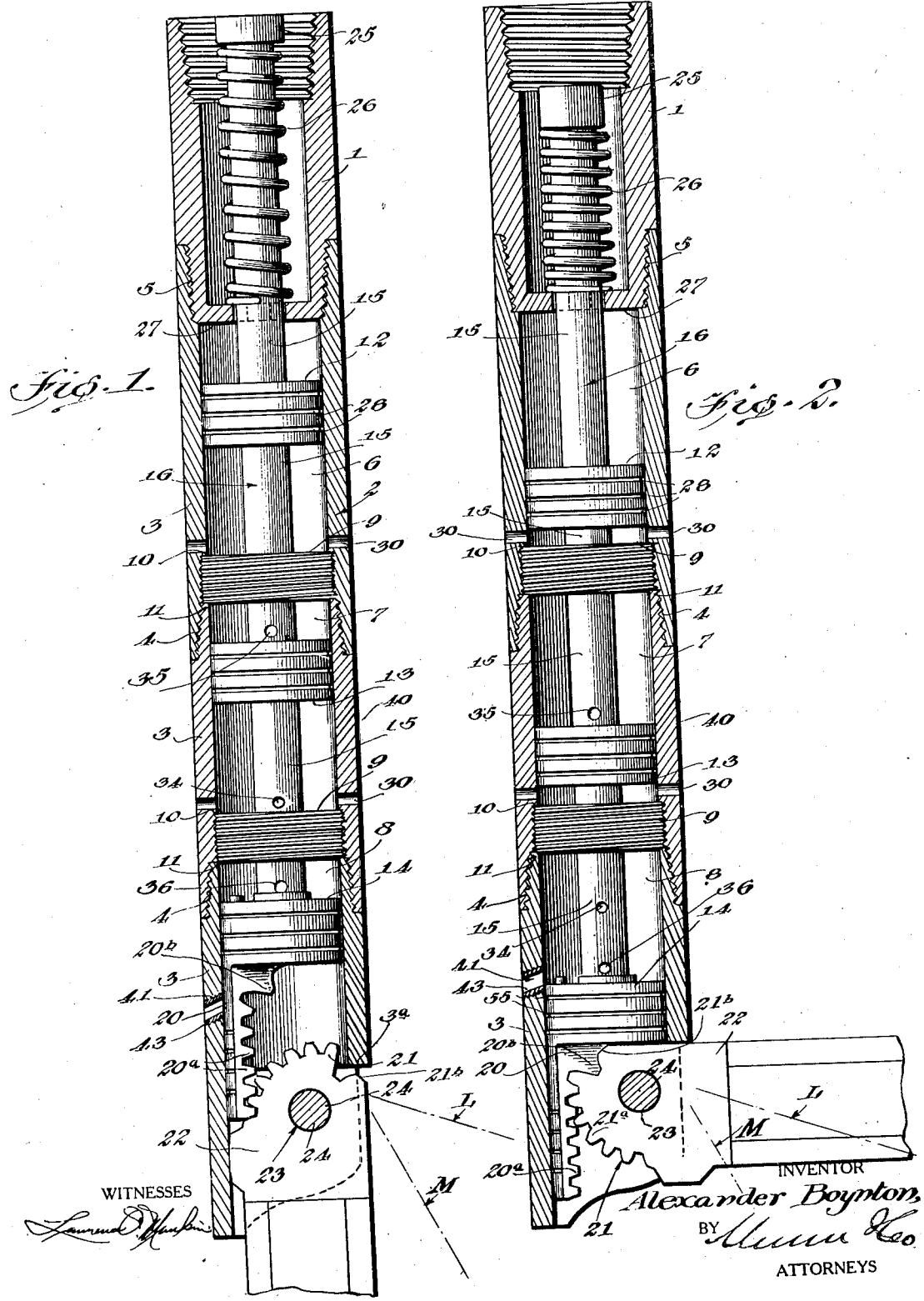

1,607,662

UNITED STATES PATENT OFFICE.

ALEXANDER BOYNTON, OF SAN ANTONIO, TEXAS.

ROTARY REAMER.

Application filed July 20, 1925. Serial No. 44,879.

This invention relates to an improvement in rotary reamer of the type forming the subject-matter of my copending applications filed April 17, 1925, Serial No. 23,879 and filed May 13, 1925, Serial No. 30,014.

The present invention aims to provide a rotary reamer having all the advantages and capacities of the rotary reamer shown and described in my co-pending applications and which has the additional advantage of being capable of developing a very high degree of power so that the reamer blade may be thrust against the surface to be reamed with the requisite degree of power under all conditions.

In carrying out this object the present invention provides a reamer casing having a reamer blade pivoted to the lower end thereof and swung outwardly under the control of a plurality of pistons, the feature of providing multiple pistons being one of the characteristic features of this invention.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a view partly in section and partly in elevation showing a rotary reamer constructed in accordance with the present invention and illustrating a position of the parts when the reamer blade is hanging vertically down, Figure 2 is a view similar to Fig. 1 but illustrating the parts as positioned when the reamer blade is horizontally disposed, Figure 3 is an enlarged fragmentary view in diametrical vertical section of the upper part of the rotary reamer assembly, Figure 4 is a similar view of the lower part, and Figure 5 is a sectional view illustrating the construction of the grooves in the back of the rack.

It is to be understood that the invention is intended for use with the usual equipment or machinery employed in the rotary drilling of oil, gas, or water wells, and the usual rotary being employed for rotating the drill stem and the standard equipment ordinarily employed being utilized for raising the drill stem. The usual pumps employed on rotary rigs are also utilized for the purpose of supplying water under pressure down through the hollow rotary drill stem to the rotary reamer constituting the present invention. These instrumentalities are so widely employed and so well known in the art of well drilling as to need no illustration here.

Referring to the drawings, the numeral 1 designates a sub employed for the purpose of connecting the rotary reamer assembly constituting the present invention to the lower end of the drill stem (not shown).

The rotary reamer assembly comprises a cylinder, designated generally at 2, and made up of sections 3 threadedly connected to each other, as at 4. The upper section 3 is threadedly connected, as at 5, to the sub 1.

The casing 2 provides an elongated cylinder which is divided up into three working chambers, designated at 6, 7 and 8 by means of circular partitions 9 threadedly connected to the sections of the casing and clamped in position against the shoulders 10 by the inner ends 11 of certain of the sections 3, as shown in the drawings.

Pistons 12, 13 and 14 are provided and are operatively fitted in the working chambers 6, 7 and 8, respectively. These pistons are fixedly connected to the sections of a hollow piston rod, designated generally at 16, the connections between the sections of the rod and the pistons being effected by threading the end of each section into the adjacent portion of the piston to which it is connected, as illustrated to advantage in Figs. 3 and 4 of the drawings.

The lowermost piston, which is designated at 14, has a rack 20 integrally formed therewith or suitably connected thereto and this rack meshes with gear teeth 21 formed on a rotary reamer blade 22. The rotary reamer blade 22 has an opening 23 through which a pivot bolt 24 extends. The opening 23 is slightly larger than the pivot bolt 24 and in practice it has been found desirable to make the opening about one thirty-second of an inch larger than the bolt. This has the advantage of insuring proper mesh of the gear teeth 21 with the teeth of the rack 20 even though the pin 24 be bent or distorted.

It will be noted that the axis of swing of the blade 22 is offset from the center of the cylindrical body of the reamer. This offsetting increases the leverage so that the power may be applied with mechanical advantage to the reamer blade. In conjunction with this feature the gear teeth of the reamer blade and of the rack are of double radius, the gear teeth 21 being for the most part long teeth, as indicated at 21$^a$, but also having a short tooth, designated at 21$^b$. The short tooth 21$^b$ clears the shoulder 3$^a$ on the casing when the reamer blade swings to a vertical position and yet this arrangement has the advantage of permitting the reamer blade to abut the shoulder 3 when the reamer blade is in a horizontal position. Similarly the rack has short teeth 20$^a$ and a long tooth 20$^b$.

For the purpose of counterbalancing the weight of the pistons, piston rod and rack, a collar 25 is threaded on the upper end of the piston rod and provides an abutment for the upper end of a coil spring 26, the lower end of the spring 26 engaging a four-prong spider 27. Each piston is provided with three peripheral grooves 28 which are for the purpose of collecting sediment from the water or fluid which might leak by the pistons. When these grooves 28 are filled with sediment they perform the office of packing rings and prevent leakage.

In order to prevent any fluid that escapes past the pistons from building up resistance to the downward movement of the pistons, vents 30 are formed in the casings 2 below the pistons 12 and 13. No vent need be provided in the lower end of the chamber 8 since this chamber opens to the exterior through its lower end.

The partitions 9 are formed with grooves 31 which serve to collect sediment like the grooves 28. The grooves 31 when filled with sediment serve as a packing for the piston rod which slides through the central openings of these annular partitions.

The fluid under pressure which is used to act on the pistons is pumped down through the drill stem by the usual pump employed on rotary rigs and travels past the prongs of the spider 27 to act directly on the upper piston 12. A portion of this fluid flows down through the hollow piston rod 16 and out through openings 35 and 36 provided in the sections of the piston rod which are located above the pistons 13 and 14 and which are disposed within the working chambers 7 and 8, respectively. The fluid pressure acts against the partitions 9 and against the pistons 13 and 14 to aid the action of the pressure on the piston 12 to force the piston rod and the pistons downwardly. The downward motion of the piston is transmitted through the rack 20 and gear teeth 21 to the reamer blade from a vertical position to a horizontal position.

In this way adequate power may be developed to thrust the reamer blade against the formation to be reamed irrespective of the character of the formation.

A fluid discharge port, designated generally at 41, is provided in the casing 2 and leads from the chamber 8 to the exterior. The wall of the opening of the discharge port 41 as originally formed is screw-threaded so that a lead bushing may be poured or cast into this opening, a suitable core being set in position to shape and form the bushing. The lead bushing is designated at 43 and it has been found that the lead bushing will resist the cutting action of sand and grit better than the hardest steel.

The discharge port 41 is located behind the rack 20 and opposite the side of the reamer from which the blade 22 extends. The extremely high fluid pressure exerted against the wall of the well through the port 41 reacts on the casing of the reamer blade and this re-action is opposed to the thrust exerted by the blade. It will no doubt be understood that the thrust exerted back against the reamer casing by the blade tends to move the casing out of the perpendicular and in some instances to distort the drill stem just above sub 1. However, with such thrust opposed by the re-action of the discharge from the port 41 distortion of the drill stem is prevented and the reamer is held in a vertical position. The efficacy of the arrangement to accomplish this function will be better appreciated when it is realized that the pump supplying pressure to the pistons operates under a pressure varying from three hundred to four hundred pounds per square inch, and that a large volume of fluid under such pressure passes through the port 41. This fluid after leaving the port 41 serves to wash away the cuttings. The port 41 is closed at the start of the reaming operation, and in order that fluid may be supplied for washing away the cuttings at such time and also for the purpose of draining the drill stem when the reamer blade is in a vertical position, an opening 34 is provided in the hollow piston rod 16 below the piston 13 so that some of the fluid will flow out through the opening 34 and through the openings 30 to the exterior of the reamer.

In order to provide for the lubrication of the lower piston 14 and the back of the rack 20 a cylindrical cavity 50 is provided in the lower piston and is designed to contain a supply of lubricant, such as oil, or the like. This lubricant is fed from the cavity 50 through a longitudinal passage 51 in the rack to transverse passages 52 which extend to peripheral grooves 53 in the back of the rack and communicate with said grooves at a point remote from the discharge port 41. The lower end of the passage 51 is provided with a removable plug 54. Grooves 55 in the periphery of the lower piston 14 are directly supplied with lubricant from the cavity 50 through passages 56 which also communicate with the peripheral grooves at points remote from the discharge port 41. On top of the lubricant, such as oil or the like which is provided in the cavity 50, a layer of cup grease, designated at 57, is disposed. This cup grease serves as a piston so that the fluid in the chamber 8 will operate to effect the feed of the lubricant, this pressure being exerted through an aperture 59 provided in the plug 60 threaded into the upper end of the cavity 50. In this way the back of the rack and the entire periphery of the lower piston are thoroughly lubricated and as these parts absorb practically all of the thrust from the gears they develop practically all of the friction and are the only parts that require lubrication.

As illustrated in Fig. 5 the grooves 53 taper from their centers toward their ends and their ends merge into the back of the rack so that the oil cannot escape past the rack through the grooves. The lines L and M in Figures 1 and 2 indicate different angular positions which the blade occupies during its swinging movement.

I claim:—

1. In a rotary reamer for wells, an elongated casing, a reamer blade pivotally mounted on the casing, a fluid pressure operated means operating said blade including a plurality of pistons, said casing having a plurality of chambers in which said pistons are operatively fitted, a piston rod connecting all of said pistons, and motion transmission means between one of the pistons and the rotary reamer.

2. In a rotary reamer for wells, an elongated casing, a blade pivotally mounted on the casing, a fluid pressure operated means for swinging the blade including a plurality of pistons, a piston rod connecting said pistons, partitions in the casing for defining a plurality of working chambers in which said pistons are operatively fitted, and motion transmission means between the lower piston and the blade.

3. In a rotary reamer for wells, an elongated casing, a blade pivotally mounted on the casing, a fluid pressure operated means for swinging the blade including a plurality of pistons, a piston rod connecting said pistons, partitions in the casing for defining a plurality of working chambers in which said pistons are operatively fitted, and motion transmission means between the lower piston and the blade, said casing having an escape port leading from the lower end of a working chamber to the exterior.

4. In a rotary reamer for wells, an elongated casing, a blade pivotally mounted on the casing, a fluid pressure operated means for swinging the blade including a plurality of pistons, a piston rod connecting said pistons, partitions in the casing for defining a plurality of working chambers in which said pistons are operatively fitted, and motion transmission means between the lower piston and the blade, said piston rod being hollow and having openings leading into certain of said chambers for conveying fluid pressure thereto.

5. In a rotary reamer for wells, an elongated casing, a reamer blade pivotally mounted on the casing, a fluid pressure operated means operating said blade including a plurality of pistons, said casing having a plurality of chambers in which said pistons are operatively fitted, a piston rod connecting all of said pistons, and motion transmission means between one of the pistons and the rotary reamer, said casing having a fluid discharge port controlled by the lowermost piston.

6. In a rotary reamer for wells, an elongated casing, a reamer blade pivotally mounted on the casing, a fluid pressure operated means operating said blade including a plurality of pistons, said casing having a plurality of chambers in which said pistons are operatively fitted, a piston rod connecting all of said pistons, and motion transmission means between one of the pistons and the rotary reamer, said casing having a fluid discharge port controlled by the lower piston, said discharge port having lead bushing, the casing having an internally threaded opening, said lead bushing having its material engaged with the threads of said body to provide discharge ports.

7. In a rotary reamer for wells, a casing, a blade pivoted to the casing, fluid pressure operated means for swinging the blade including a piston, the casing having a chamber in which the piston is operatively fitted, a rack carried by the piston, gear teeth on the blade meshed with the rack, said piston having an opening therein providing an oil reservoir, peripheral grooves in the lower piston and in the rack, passages between the opening and the peripheral grooves, and an apertured plug between the opening of the piston and the chamber whereby the rack and piston are lubricated.

8. In a rotary reamer for wells, an elongated casing consisting of a plurality of threadedly connected sections, a plurality of annular partitions threadedly connected with the sections of the casing and clamped between the sections to define a plurality of working chambers in the casing, a blade pivoted to the casing, a plurality of pistons pivoted in the working chambers, a piston rod connecting said pistons, and motion transmission means between one of the pistons and the blade.

9. In a rotary reamer for wells, an elongated casing, a reamer blade pivotally mounted on the casing, a fluid pressure operated means operating said blade including a plurality of pistons, said casing having a plurality of chambers in which said pistons are operatively fitted, a piston rod connecting all of said pistons, motion transmission means between one of the pistons and the rotary reamer, and means for counterbalancing the weight of the pistons and rack.

10. In a rotary reamer for wells, a casing, a reamer blade pivoted on the casing and fluid pressure operated means for swinging the reamer blade, said casing having a discharge port opposite the reamer blade, whereby the fluid discharged from the port will oppose and aid the casing in resisting the backward thrust exerted by the blade.

ALEXANDER BOYNTON.